(12) United States Patent
Platz et al.

(10) Patent No.: US 6,731,351 B2
(45) Date of Patent: May 4, 2004

(54) DISPLAY ASSEMBLY INCLUDING AN ELECTRO-OPTICAL CELL AND A PHOTOVOLTAIC CELL

(75) Inventors: Rainer Platz, Neuchâtel (CH); Eric Saurer, Bevaix (CH); Naci Basturk, Enges (CH)

(73) Assignee: Eta SA Fabriques d'Ebauches, Grenchen (CH)

( * ) Notice: Subject to any disclaimer, the term of this patent is extended or adjusted under 35 U.S.C. 154(b) by 103 days.

(21) Appl. No.: 09/909,755

(22) Filed: Jul. 23, 2001

(65) Prior Publication Data

US 2002/0027620 A1 Mar. 7, 2002

(30) Foreign Application Priority Data

Jul. 21, 2000 (CH) ................................................ 1442/00

(51) Int. Cl.$^7$ ......................... G02F 1/135; G02F 1/1335
(52) U.S. Cl. ......................... 349/27; 349/113; 136/256
(58) Field of Search ............................................ 349/27

(56) References Cited

U.S. PATENT DOCUMENTS

| | | | |
|---|---|---|---|
| 4,095,217 A | | 6/1978 | Tani et al. |
| 4,126,150 A | * | 11/1978 | Bell et al. ................ 136/255 |
| 4,435,047 A | | 3/1984 | Fergason |
| 4,472,627 A | * | 9/1984 | Weinberger ............... 235/487 |
| 4,485,125 A | | 11/1984 | Izu et al. |
| 4,583,815 A | * | 4/1986 | Taga et al. ............... 219/203 |
| 5,188,760 A | | 2/1993 | Hikmet et al. |
| 5,403,404 A | * | 4/1995 | Arya et al. ............... 136/249 |
| 5,437,811 A | | 8/1995 | Donne et al. |
| 5,456,762 A | * | 10/1995 | Kariya et al. ............. 136/258 |
| 5,457,057 A | | 10/1995 | Nath et al. |
| 5,963,282 A | | 10/1999 | Battersby |
| 5,990,995 A | * | 11/1999 | Ebihara et al. ............ 349/113 |
| 6,459,035 B2 | * | 10/2002 | Ziegler et al. ............ 136/257 |

FOREIGN PATENT DOCUMENTS

| | | |
|---|---|---|
| EP | 0 600 349 A1 | 6/1994 |
| EP | 0 814 365 A2 | 12/1997 |
| EP | 0 451 905 B1 | 1/1998 |
| EP | 0 872 783 A1 | 10/1998 |
| EP | 0 926 574 A1 | 6/1999 |
| EP | 0 939 331 A2 | 9/1999 |
| EP | 0 948 060 A1 | 10/1999 |
| EP | 1 113 503 A1 | 7/2001 |
| JP | 60-147720 A2 | 8/1985 |

OTHER PUBLICATIONS

Delphion English Abstract for JP 60–147720 A2, 2 pages.
Bahadur, B. (ed.): Liquid Crystals Application and Uses (vol. 1). World Scientific Publishing Co., Singapore, 1990, pp. 196–227.
Duchene, J. et al.: Electrolytic Display. SID, Oct. 24–26, 1978, pp. 34–37.
Potter, R.F. (ed): Large–Area Chromogenics: Materials and Devices for Transmittance Control (vol. IS 4), C.M. Lampert and C.G. Granqvist (eds), Part 9: Electrochromic Devices. SPIE Optical Engineering Press, Bellingham, WA, 1990, pp. 414–547.

* cited by examiner

*Primary Examiner*—Julie-Huyen L. Ngo
(74) *Attorney, Agent, or Firm*—Griffin & Szipl, PC

(57) ABSTRACT

A display assembly is disclosed including an electro-optical cell (28), for example a liquid crystal cell, and a photovoltaic cell (61) acting as a back reflector. In order to improve the aesthetic appearance of the display, the photovoltaic cell (61) reflects predetermined wavelengths and thus exhibits a desired color in the transparent zones (90) of the electro-optical cell. In particular, the reflected light can be colored by reflection onto a multi-layered reflective filter including a transparent electrode (69) of the photovoltaic cell. This cell may form part of the dial of a watch.

13 Claims, 8 Drawing Sheets

DISPLAY ASSEMBLY INCLUDING AN ELECTRO-OPTICAL CELL AND A PHOTOVOLTAIC CELL

FIELD OF THE INVENTION

The present invention concerns a display assembly including a photovoltaic cell and an electro-optical cell disposed in front of the photovoltaic cell and capable of presenting transparent zones for transmitting incident light to the photovoltaic cell.

BACKGROUND OF THE INVENTION

U.S. Pat. No. 4,095,217 discloses a display assembly of this type, which can be used in electronic apparatus such as calculators and digital watches. This assembly includes a nematic liquid crystal display provided with a polariser on both of its faces and a filter on the front polariser, in order to reduce reflection of the ambient light and to improve contrast. A solar cell, for example a silicon cell, is applied to the back of the back polariser and acts as a reflector for the liquid crystal display, while the non reflected part of the luminous energy reaching the solar cell is able to be converted into electric energy to operate the apparatus.

One drawback of such an arrangement is that the colour of the light reflected by the solar cells of this type is not attractive. In particular, silicon photovoltaic cells have a dull, dark colour, particularly a brownish or greyish colour, which is unsuited to applications in which aesthetic appearance plays an important role such as in horology.

In order to overcome this, the insertion of a filterm between a liquid crystal display and a photovoltaic cell has been proposed, so that the light reflected to the display has a desired colour. For example, in the abstract published in the Espacenet database concerning Japanese Patent No. 60-147720 A, a selective reflection filter is disposed on the back of the liquid crystal display and reflects the light of a specific wavelength towards it, for example blue. The light transmitted through the filter is absorbed by an absorbing layer, which may be a solar cell. The light which has passed through liquid crystal zones which are in transparent mode is reflected downwards, so that these zones appear black to the observer. Conversely, in the liquid crystal zones which are in dispersion mode, the reflected blue light is dispersed by these zones, which thus appear to the observer in blue on a black background. This liquid crystal display structure has the advantage of allowing the colour of the diffusing zones of the display to be selected freely, but the background is always black. Moreover, such a filtering layer in the display involves a certain absorption of luminous energy, which reduces the amount of energy able to be converted into electricity. On the other hand, in cases where one wishes to cause other elements to appear behind the liquid crystal display, for example watch hands in the case of a combined analogue and digital display, these elements will appear coloured by subtraction of the light reflected by the filter.

European Patent No. 0 814 365 also discloses display assemblies including, from top to bottom, a liquid crystal cell having regions which can be switched between a transparent state and a diffusing state, a reflective layer having a reflectivity of 5% to 50% and reflecting a specific colour within the visible range, and an absorbing layer which may be a solar cell. In order to transmit enough energy to the solar cell, the reflective layer has low absorption and transmits most of the light in the rest of the visible range and within the infrared range. It may be formed by a dielectric film including from 25 to 30 layers or by a metal film. These films can in certain cases be deposited on the solar cell. However, this structure, as in the case of Japanese Patent No. 60-147720 A, requires semi-reflective layers to be placed between the two cells and has the same drawbacks.

SUMMARY OF THE INVENTION

The present invention avoids these drawbacks owing to a display assembly indicated in the preamble, characterised in that the photovoltaic cell is arranged to reflect predetermined visible wavelengths of the light transmitted through the electro-optical cell, so that it forms a coloured reflector behind the electro-optical cell.

In other words, it is the photovoltaic cell itself, via one or several of its operational layers, which reflects light of a desired colour in the direction of the electro-optical cell, without it being necessary to insert other filtering or reflective layers between the two cells.

Consequently, one can select the colour in which the observer will see the transparent zones of the electro-optical cell, generally forming the background colour of the display. The other zones of the display will have their own colour, determined by the nature and structure of the electro-optical cell and able to be contrasted significantly with respect to the colour of the background. Any element inserted between the electro-optical cell and the photovoltaic cell will be seen with its own colour in the transparent zones of the display and one could thus give it a colour which goes well with that of the background, to obtain the desired aesthetic effect. Reflection on the photovoltaic cell may be of the specular type, but slightly diffusive reflection may be provided in order to remove undesirable optical effects.

In an advantageous embodiment of the invention, reflection of said predetermined wavelengths is a reflection on a multi-layered reflective filter including a transparent top electrode of the photovoltaic cell. By using such a reflection mode with a transparent electrode forming an integral part of the photovoltaic cell, a coloured reflection can be obtained without adding any optical element capable of absorbing light, so that a maximum amount of luminous energy is available for conversion into electric energy. This aspect is particularly important in portable electric apparatus using an electric energy accumulator and having to have a long operating autonomy, as is the case in watches.

In another embodiment of the invention, the photovoltaic cell includes a semi-transparent metal top electrode, which forms said coloured reflector.

BRIEF DESCRIPTION OF THE DRAWINGS

Other features and advantages of the present invention will appear in the following description of various embodiments, given by way of non-limiting example with reference to the annexed drawings, in which.

DETAILED DESCRIPTION OF ILLUSTRATIVE EMBODIMENTS

Figure 1:
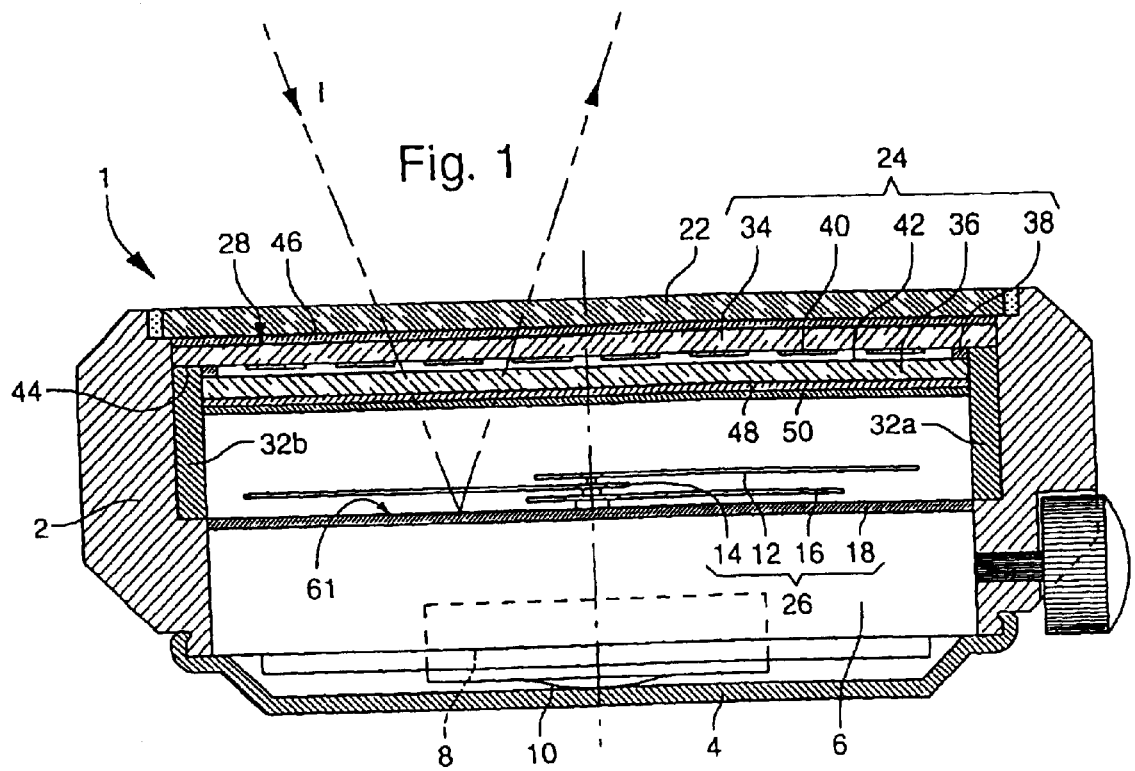
FIG. 1 is a cross-section of a wristwatch fitted with a display assembly including a liquid crystal display cell and a semi-conductor photovoltaic cell, the liquid crystal display being in a first switching state where it is completely transparent.

The description of the invention will be made within the scope of an application to a timepiece such as a wristwatch. However, it goes without saying that the invention is not limited to this application and that it could advantageously be used within the scope of any other application requiring the display of data, in particular portable electronic apparatus, such as calculators, telephones, electronic games, measuring instruments, etc., or fixed apparatus such as computer screens or advertising hoardings or road signs.

With reference to FIGS. 1 to 4, a timepiece 1 of the wristwatch type is shown, which includes in a conventional manner a case 2 provided with a back cover 4 in which are arranged an electronic clockwork movement 6 and an electric accumulator 8 which rests on back cover 4 via a contact spring 10. Movement 6 includes electronic time-keeping circuits associated, via a control circuit, with a drive device (not shown) for a second hand 12, a minute hand 14 and an hour hand 16. These hands 12, 14 and 16 move above a dial 18 which bears time symbols 20 visible in FIG. 2. Case 2 is preferably closed in a conventional manner by a crystal 22 which covers the whole of the display assembly.

Watch 1 further includes a display assembly including two superposed display devices, respectively top device 24 and bottom device 26. In the example shown, bottom display device 26 includes display means for time-related data, in particular analogue time display means formed by hands 12, 14, 16 and dial 18.

Dial 18 is formed by a rigid substrate the top face of which is covered by a photovoltaic cell 61 (also called a solar cell) or by a set of several such cells which are juxtaposed and connected in series, to charge accumulator 8 via a charge circuit incorporated in movement 6. This cell or set of cells acts as a reflector for top display device 24. The structure of the dial will be described hereinafter.

Figure 2:
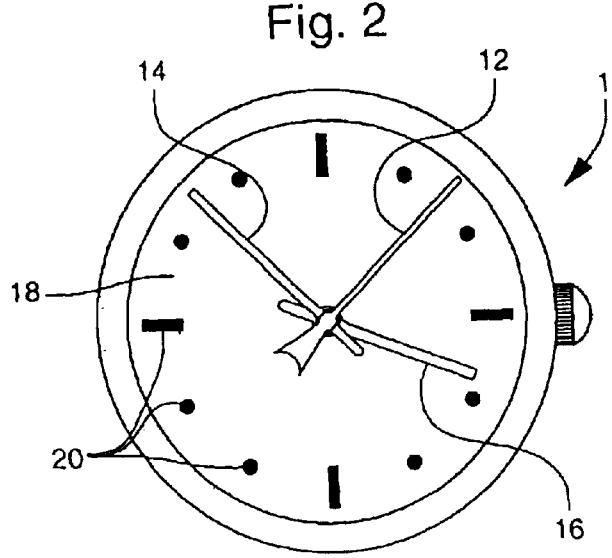
FIG. 2 is a top view of the wristwatch shown in FIG. 1.
Figure 3:
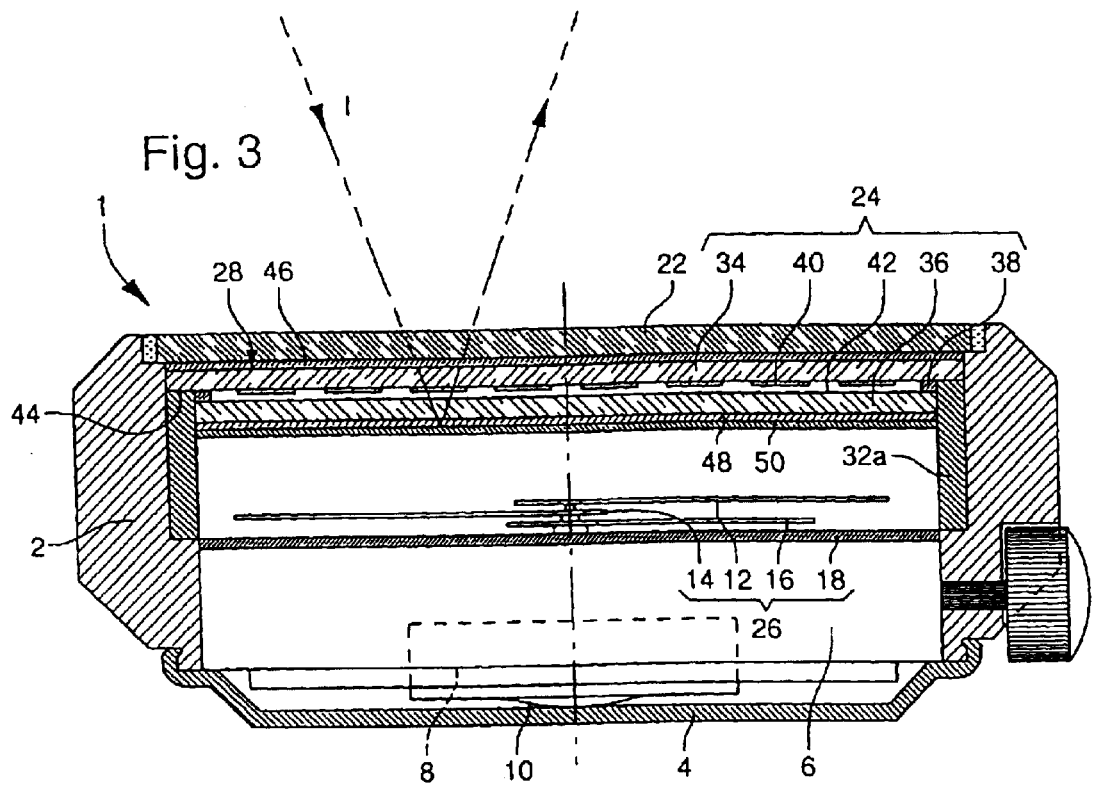
FIGS. 3 and 4 are similar views to those of FIGS. 1 and 2, the liquid crystal display being in a second switching state in which it displays an item of information in reflective opaque characters on a coloured background.
Figure 4:
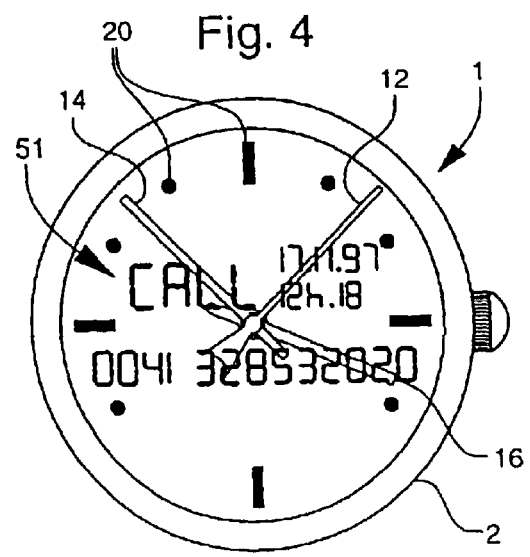

Top display device 24 may be, amongst other things, any of the types described in European Patent Nos. 0 926 574 and 0 939 331 which are cited here by way of reference. It includes an electro-optical cell 28, for example a liquid crystal cell, and extends between bottom display device 26 and crystal 22. In the example shown, this top display device 24 covers the entire surface of dial 18. It goes without saying that, in an alternative embodiment, top display device 24 could form crystal 22 of watch 1. Top display device 24 is arranged so that electro-optical cell 28 is transparent in a first switching state to make visible the data displayed by bottom display device 26, namely ands 12, 14 and 16 and dial 18. Such a configuration of the display device according to the invention is shown in FIGS. 1 and 2. Moreover, top display device 24 is arranged so that electro-optical cell 28 displays an item of data, for example of the alphanumeric type, in a second switching state. Such a switching configuration of the display assembly according to the invention is shown in FIGS. 3 and 4.

The switching of electro-optical cell 28 from the first state to the second state and conversely is assured by control means (not shown) integrated in movement 6, these control means being connected to cell 28 via conventional connectors 32a, 32b to provide it with a control voltage. In the example shown, connectors 32a, 32b also form a flange disposed between the top edge of dial 18 and the bottom edge of cell 28.

Cell 28 may be a electro-optical cell with liquid crystals of the absorbent, diffusing or reflective type in the second switching state.

According to a preferred embodiment, electro-optical cell 28 is a twisted nematic (TN or STN) type liquid crystal cell. This cell 28 includes a transparent front substrate 34, a transparent back substrate 36 and a sealing frame 38 delimiting with substrates 34 and 36 a cavity in which a liquid crystal layer is located. The mutually opposite faces of substrates 34 and 36 include transparent electrodes 40 and 42, made for example of indium/tin oxide (ITO). In the example illustrated, front substrate 34 carries electrodes 40 in segments allowing alphanumerical characters to be displayed, while back substrate 36 carries an electrode 42 extending over its entire surface. Electrodes 40 and 42 are connected to connectors 32a and 32b via contact pads 44 located outside the cavity. Cell 28 further includes, on the side of crystal 22, a linear polariser 46 and, on the side of dial 18, a quarterwave plate 48 associated with a cholesteric film 50.

The assembly formed by quarterwave plate 48 and cholesteric film 50 could be replaced by a reflective polariser for example with a wide band of the DBEF or RDF-C type manufactured by 3M, or a selective reflective type to colour the segments of the characters or symbols to be displayed.

Preferably, polariser 46 is of the type with high polarisation and transmission efficiency, such as, for example, the polariser marketed by the Sanritsu company, Japan under the reference LLC$_2$5618SF.

It will also be noted that, according to a variant, liquid crystal cell 28 can be replaced by a colour display device such as that described in European Patent No. 0 600 349 which is also cited here by way of reference.

According to another variant, one may choose a cholesteric film 50 capable of reflecting a wavelength or part of the visible spectrum corresponding to a predetermined colour. One can thus choose to display data in a complementary colour to that of the dial and thus improve the contrast and aesthetic appearance of the display assembly.

When voltage is applied across electrode 42 and certain of electrodes 40, the segments located between these electrodes 40, 42 are made to pass from a transparent state to an absorbent, reflective or diffusing state.

Since cell 28 is a cell with nematic liquid crystals twisted at 90°, polariser 46 is of the conventional linear type, quarterwave plate 48 polarises light in a circular manner to the right, and cholesteric film 50 with a left handed twist. Thus, cell 28 is totally transparent (FIGS. 1 and 2) in the first switching state, i.e. when no voltage is applied across the terminals of electrodes 40, 42 (non switched state). This state is symbolised by the ray of light I1 in FIG. 1, where it can be seen that it passes through cell 28 and is reflected by dial 18. Cell 28 is, on the other hand, absorbing, reflective or diffusing in its switched regions (FIGS. 3 and 4) in the second switching state, i.e. when voltage is applied across the terminals of electrodes 40, 42 (switched state). This second state is shown by the ray of light I2 in FIG. 3 where it can be seen that it is reflected by cell 28. One can thus display data 51 in an opaque colour on a reflective background, the opacity being determined by the colour reflected by cholesteric film 50, and the background being determined by the colour of dial 18.

Figure 5:
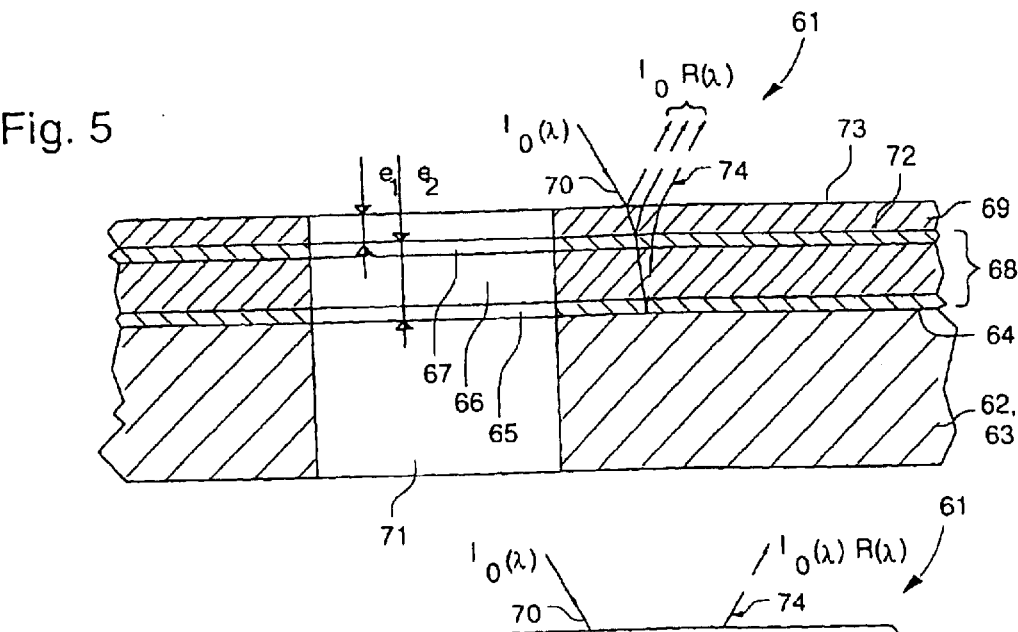
FIG. 5 is a schematic partial cross-section of a first embodiment of a silicon photovoltaic cell used as a reflector in accordance with the invention and forming the dial of the watch shown in FIGS. 1 to 4.
Figure 6:
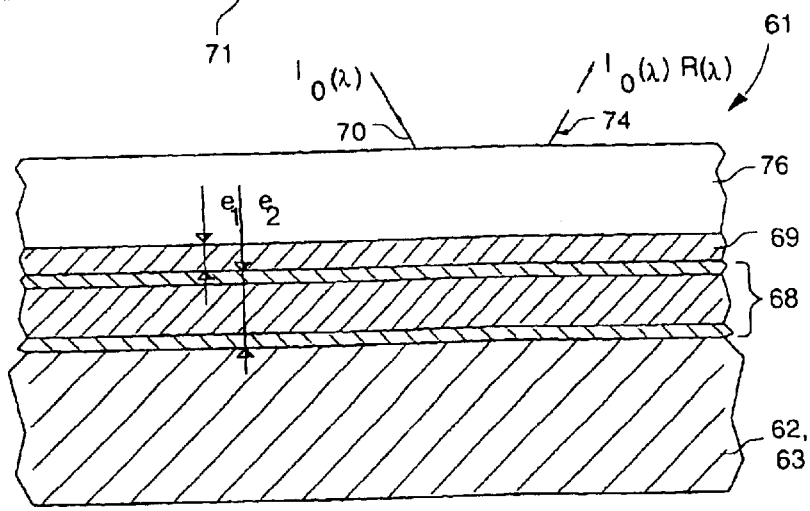
FIG. 6 is a similar view to FIG. 5, showing a second embodiment of the photovoltaic cell.
Figure 7:
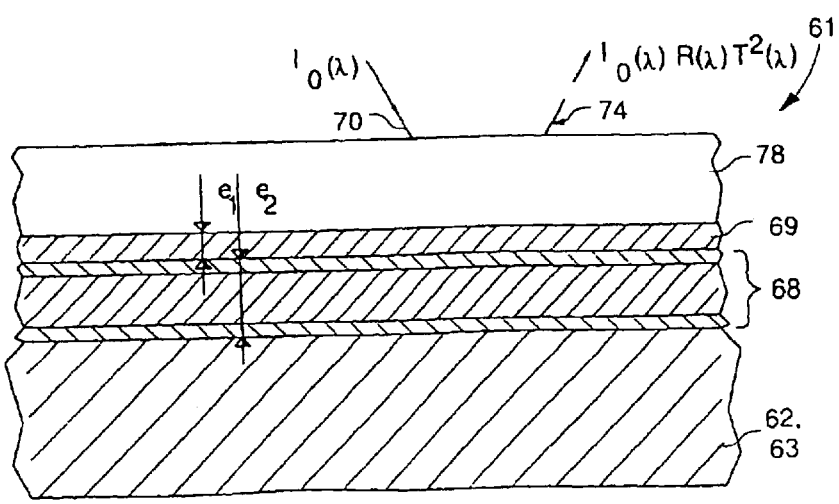
FIG. 7 is a similar view to FIG. 6, showing a third embodiment of the photovoltaic cell.

Dial 18, which acts in particular as a multi-layered reflective filter to send back coloured light to-waords the liquid crystal display of the watch shown in FIGS. 1 to 4, is preferably formed by a photovoltaic cell 61 of one of the types shown in FIGS. 5 to 7. These types of cells are also described in European Patent Application No. 991260005.0, which had not yet been published at the priority date of the present application, but that has since been published as EP 1 113 503 A1.

With reference to FIG. 5, photovoltaic cell 61 includes a metal substrate 62 which acts as bottom electrode 63 of the cell. Substrate 62 is preferably made of stainless steel, but other metals such as aluminium or a metal substrate coated with chromium may be used. The top surface 64 of the substrate reflects light, either specularly, or in a diffused manner, in order to improve the power efficiency. In a preferred embodiment, substrate 62 supports a stack of three thin layers 65, 66 and 67 of a semiconductor material, respectively of types n, i and p or conversely, to form the active part of a n-i-p or p-i-n junction photodiode, indicated by reference 68. The semiconductor material is preferably hydrogenated amorphous silicon (a-Si:H). Onto the stack of silicon layers there is applied a transparent top electrode 69 formed of a thin layer of conductive oxide (TCO), for example a layer of indium oxide doped with tin (ITO), or a layer of tin oxide doped with antimony, or tin oxide doped with fluoride, or zinc oxide doped with aluminium.

In the watch, the connection of electrodes 63 and 69 to the charge circuit of the electric accumulator is effected in a conventional manner on an edge of dial 18 formed by cell 61. A central hole 71 is arranged through the dial, to allow the shafts of the watch hands to pass.

Of course, bottom electrode 63 could include a reflective metal layer made of a material distinct from substrate 62, in the event that the material of the substrate was not compatible with the adjacent n or p type layer 65. Such a metal layer may itself form electrode 63 on a substrate made of non-conductive material.

The semiconductor and TCO layers can be deposited by conventional methods allowing the thickness of the layers to be carefully controlled, for example RF plasma deposition for the semiconductor and cathodic sputtering deposition for the TCO. Examples of methods for manufacturing photovoltaic cells of this type in batches are explained in particular in U.S. Pat. Nos. 4,485,125 and 5,457,057 and European Patent No. 948 060.

The layers of silicon forming in this case the active photodiode part 68 have a controlled total thickness $e_2$ and a refractive index having a real part of approximately 4. The ITO forming top electrode 69 has a controlled thickness $e_1$ and a real refractive index of approximately 2, absorption being able to be ignored in the particular case of such a layer. Consequently, the two constituent layers 68 and 69 of the photovoltaic cell, arranged between the air and the metal substrate, form, by means of interfaces 64, 72 and 73, an interferential optical system having a reflectance $R(\lambda)$, where $\lambda$ is the wavelength of the incident light 70, which has a spectral intensity $I_0(\lambda)$. The light 74 reflected by cell 61, of spectral intensity $I_0(\lambda) R(\lambda)$, has a coloured appearance dependent on the reflectance $R(\lambda)$ defined by the indices and thicknesses of the elements of the interferential system, which forms a multi-layered reflective filter.

Knowing the refractive indices of the materials used to make the photovoltaic cell, one can calculate the interferential reflection spectrum and the corresponding chromatic indices as a function of thicknesses $e_1$ and $e_2$ and select the combinations of thickness providing the desired colours, taking account of the constraints imposed to obtain good electrical and mechanical characteristics for the photoelectric cell. The same operations may be made with other materials having other refractive indices.

Of course, it is possible to use other semiconductors in place of silicon to form the photodiode. One can cite as examples photovoltaic cells in thin layers based on semiconductors of the chalcopyrite family, including in particular CU (In, Ga), $Se_2$ and $CuInS_2$ (also called CIGS and CIS), and CdTe based cells in thin layers. The refractive index of these materials is less suited to obtaining a coloured reflection via interference, but this remains possible.

FIG. 6 shows a second embodiment wherein the structure of photovoltaic cell 61 described with reference to FIG. 5 is completed by a layer of clear or diffusing lacquer 76, applied onto top electrode 69. This layer, having a refractive index of approximately 1.5 and a thickness of the order of 1 $\mu$m to several tens of $\mu$m, modifies the reflectance $R(\lambda)$ of the subjacent interferential system, because its refractive index is different to that of electrode 69. Moreover, a diffusing lacquer reproduces the appearance of conventional dials better, while reducing or removing the angular dependence of the interference in the reflected light. In this example, the lacquer of layer 76 has no intrinsic absorption, i.e. no colour of its own. Since its thickness is relatively large, its only notable influence in the interferential reflection is that of its refractive index modifying the optical conditions at the interface between the lacquer and top electrode 69. Further, the lacquer constitutes mechanical and chemical protection for electrode 69.

FIG. 7 shows a third embodiment wherein the structure of photovoltaic cell 61 described with reference to FIG. 5 is completed by a layer of coloured lacquer 78, which is transparent or slightly diffusing, applied onto top electrode 69. In addition to producing the same effects as the layer of colourless lacquer 76, coloured lacquer 78 has a transmission spectrum $T(\lambda)$ which modifies the reflected light 74 the spectrum of which is obtained by convoluting spectra $I_0(\lambda)$, $R(\lambda)$ and $T^2(\lambda)$. By this means, it is possible to modify the colour of the reflected light, for example in order to remove certain undesirable components of the interferential reflection spectrum. This allows a great number of nuances of colour to be obtained by using the principles of the present invention.

Figure 8:
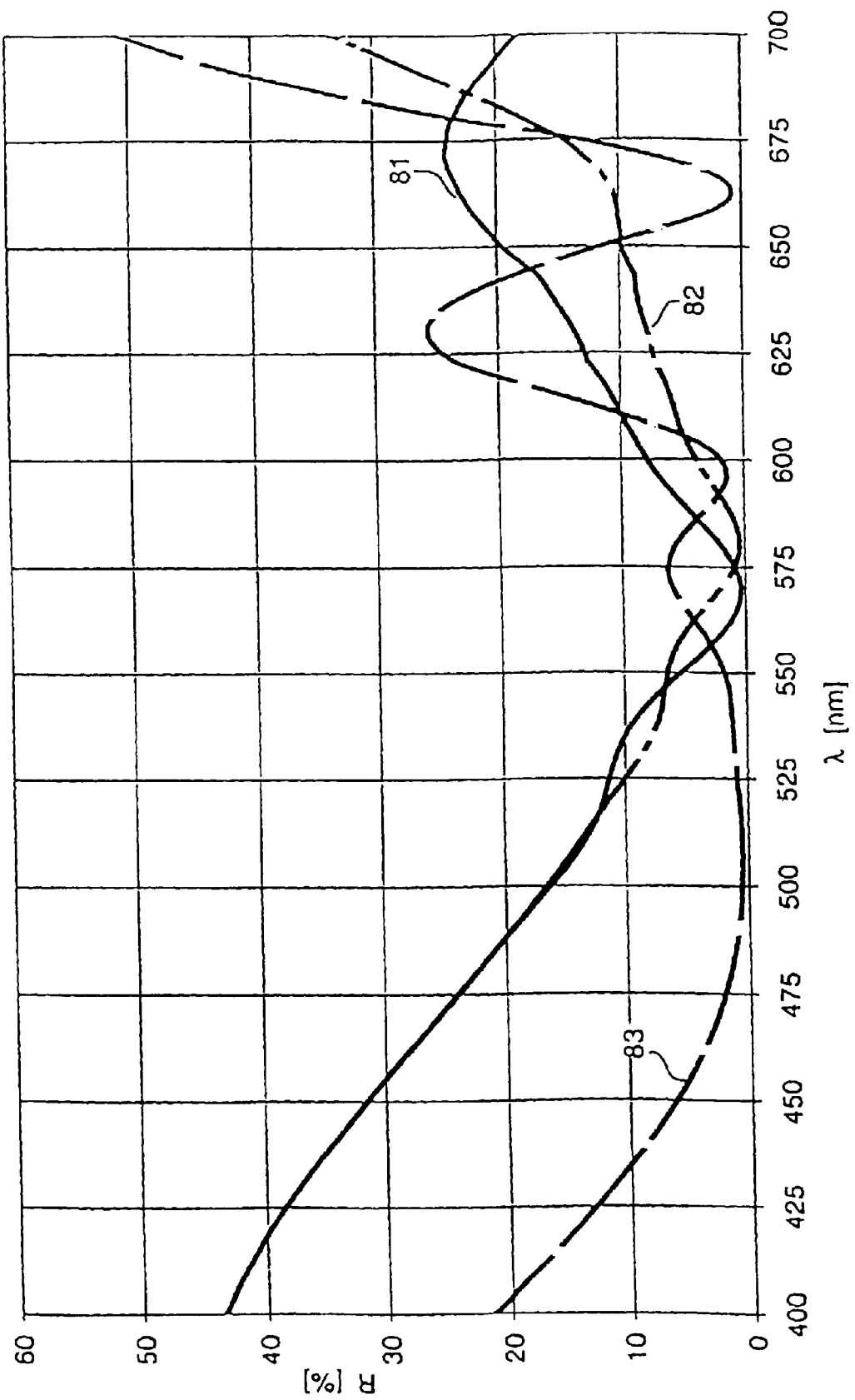
FIG. 8 shows the reflectance as a function of the wavelength, obtained with the structure illustrated by FIG. 5 for different pairs of thickness of the silicon and the transparent top electrode.
Figure 9:
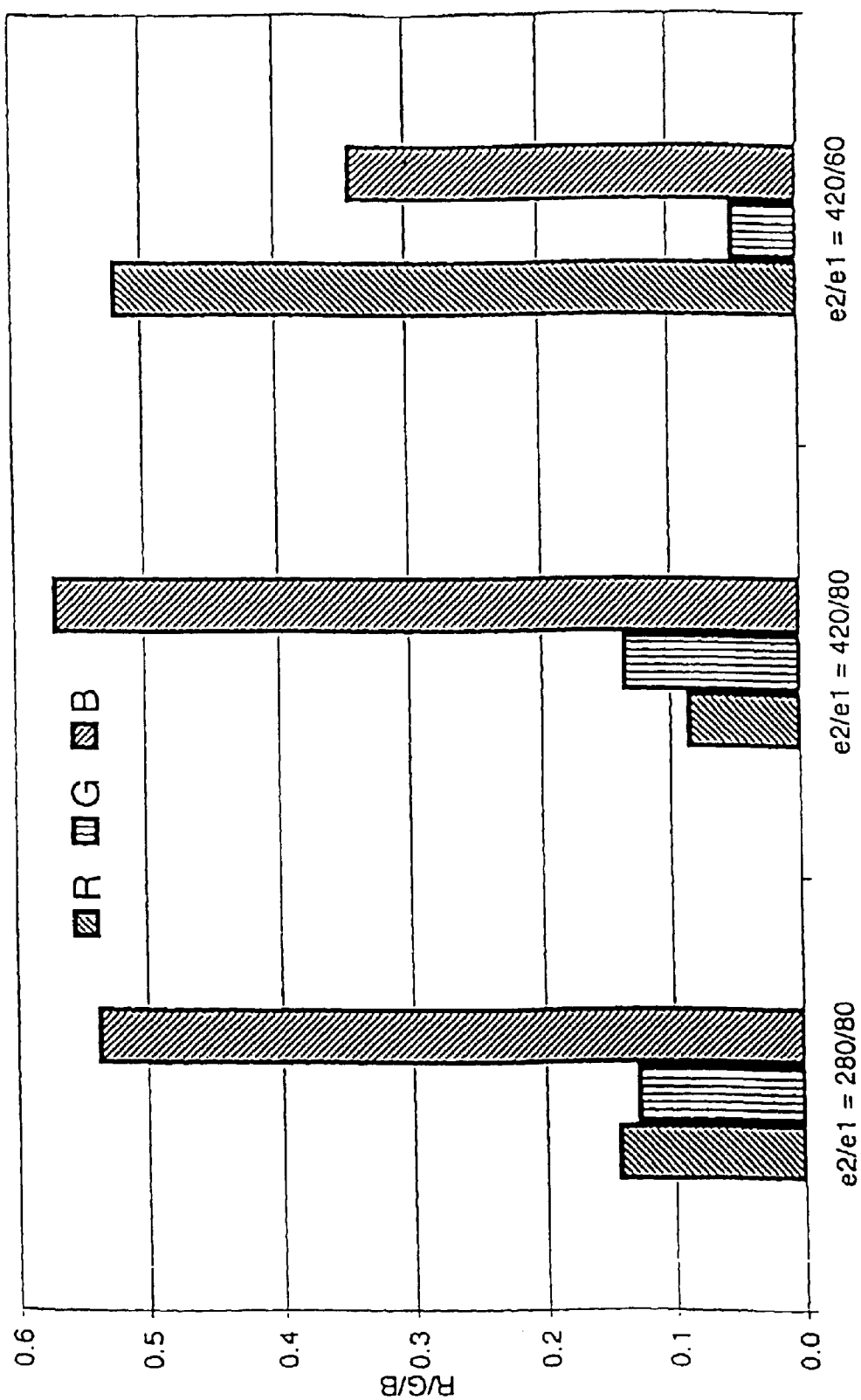
FIG. 9 shows the RGB co-ordinates of the reflected light for the structures whose reflection spectrum is shown in FIG. 8.

FIG. 8 is a spectral diagram of the reflectance R as a function of the wavelength $\lambda$ for three examples of photovoltaic cells having the structure illustrated in FIG. 5, for three different pairs of thicknesses $e_1$ and $e_2$. FIG. 9 shows the co-ordinates of colours R (red), G (green) and B (blue) for these three examples.

Spectrum 81, shown in continuous lines, corresponds to thickness values $e_2=280$ nm of silicon and $e_1=80$ nm of ITO. According to FIG. 9, the reflected light will have a dominant blue colour.

Spectrum 82, shown in dot-and-dash lines, corresponds to the same value $e_1=80$ nm as in the preceding example, but with a value $e_2=420$ nm for the silicon thickness. It can be seen that the spectrum is thus modified in the green and red region and that the reflected light will also have a dominant blue colour but slightly different. In conjunction with photodiode 68 made of a-Si:H, this arrangement is excellent from the energy point of view, because the selective mirror transmits in this case more than 90% of the luminous energy in the range of wavelengths from 500 to 650 nm, in which a-Si:H has its most efficient conversion into electric energy. In the part of the spectrum where the a-Si:H photodiode operates, approximately 20% of the light is reflected and approximately 80% is absorbed by the photovoltaic cell.

Spectrum 83 shown in dashed lines, corresponds to the same value $e_2=420$ nm as in the preceding example, but with a value $e_1=60$ nm instead of 80 nm for the ITO thickness. It can be seen that the spectrum is thus greatly modified in several regions and that the reflected light will have a dominant magenta colour. It can thus be deduced that the thickness of the ITO electrode has a preponderant importance in the examples considered.

Figure 10:
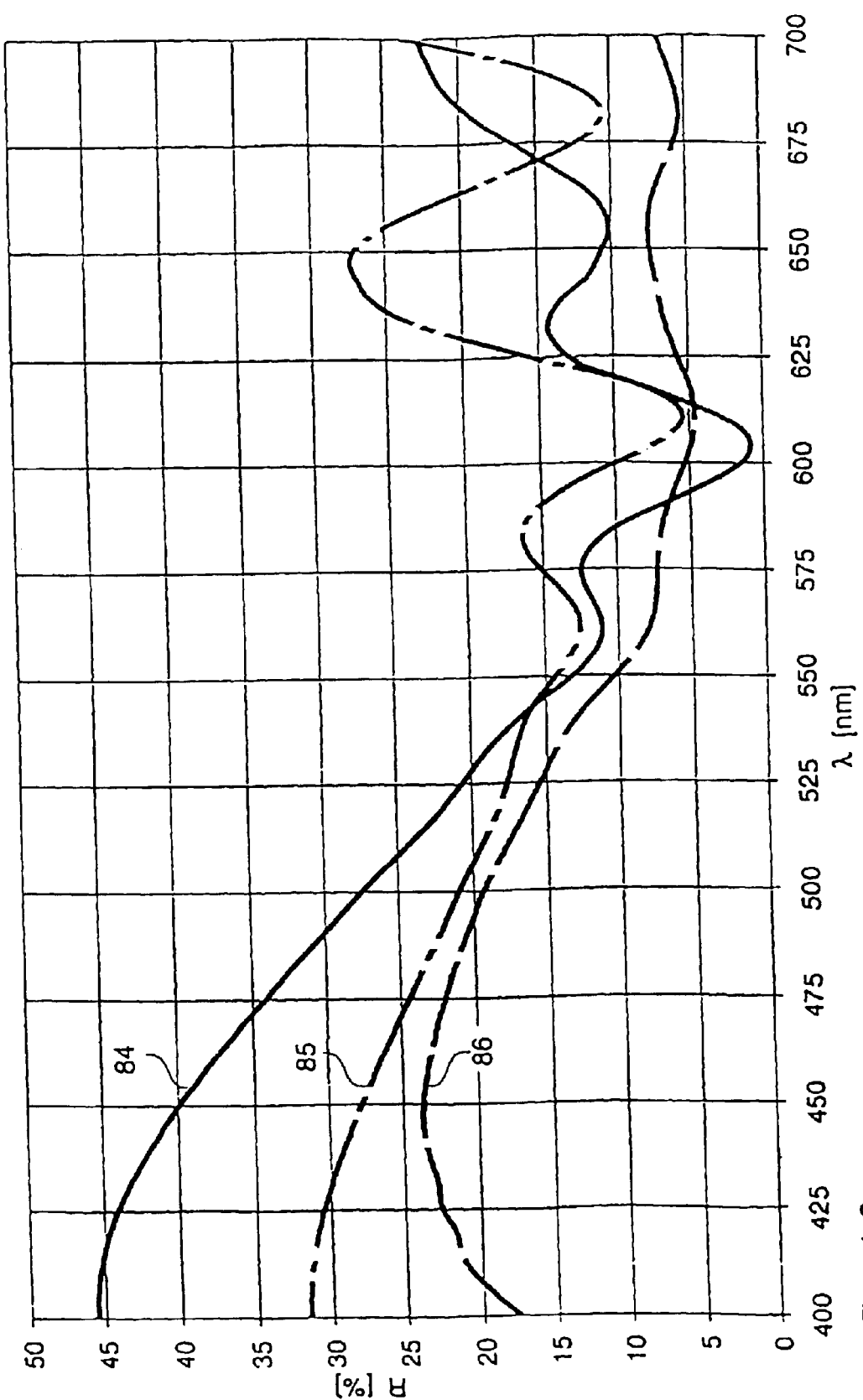
FIG. 10 shows the reflectance as a function of the wavelength, obtained with the structures respectively illustrated in FIGS. 5, 6 and 7, for a chosen pair of respective thickness of the silicon and the transparent top electrode.
Figure 11:
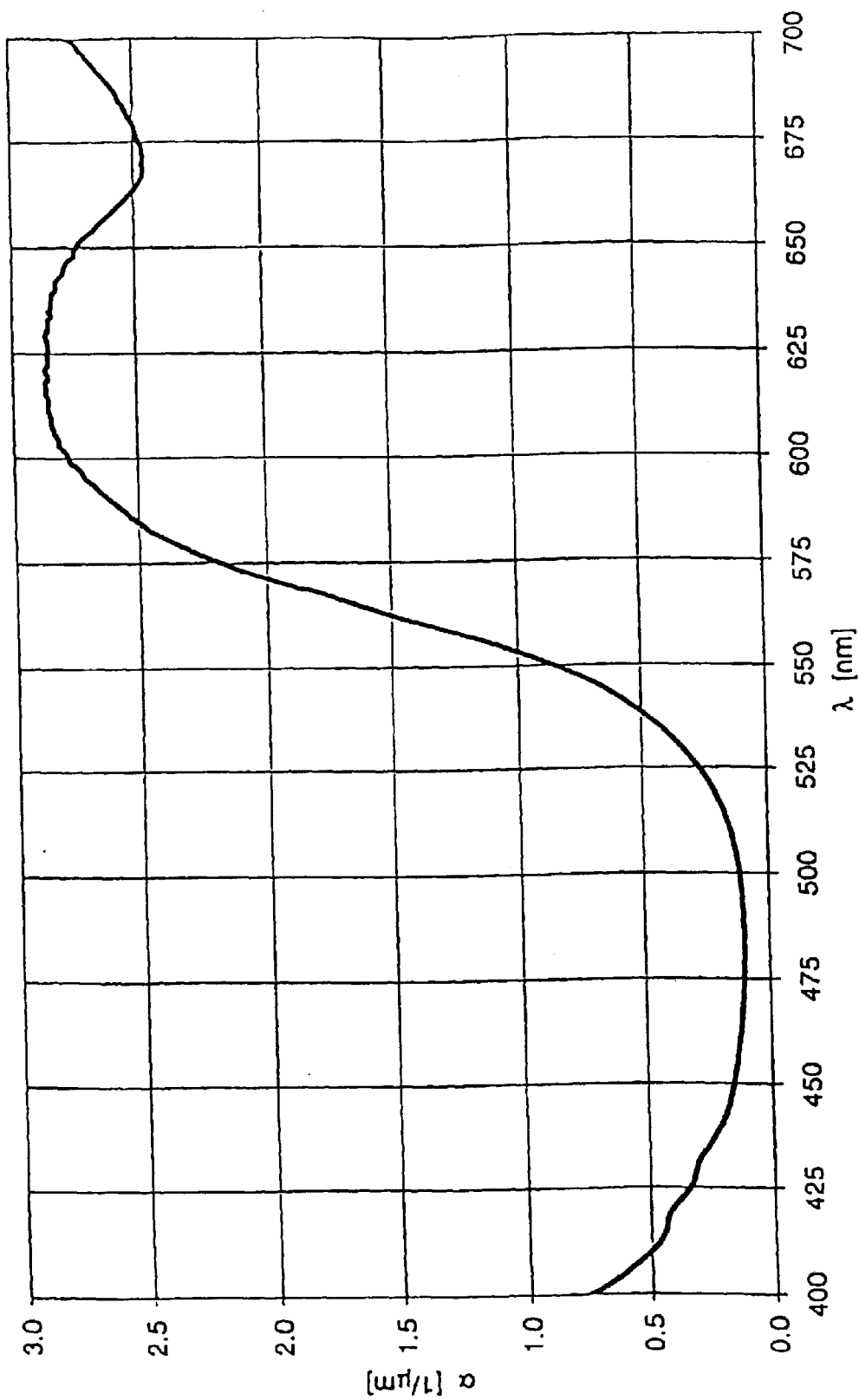
FIG. 11 shows the absorption spectrum of a colorant used in one case shown in FIGS. 7 and 10 (curve 86)

FIG. 10 is a spectral diagram of the reflectance R as a function of the wavelength $\lambda$ for three examples of photovoltaic cells having the structures illustrated respectively in FIGS. 5, 6 and 7, for a same pair of values $e_2=450$ nm and $e_1=90$ nm of the respective thickness of silicon and ITO. Spectrum 84, shown in a continuous line, corresponds to the lacquer free version of FIG. 5 and has a strong blue dominance. Spectrum 85, shown in dot-and-dash lines, corresponds to the version of FIG. 6, with a layer of colourless lacquer 76 of index 1.5 having a thickness of several $\mu$m. In comparison to spectrum 84, it is greatly reduced in blue and much more marked in green and red. Spectrum 86, shown in a dashed line, corresponds to the version of FIG. 7, with a layer of lacquer 78 mixed with a blue colorant whose absorption spectrum $\alpha(\lambda)$ is shown in FIG. 11, this layer having a thickness of several $\mu$m. It can be seen that the addition of colorant reduces the quantity of reflected light, especially in yellow and red.

The coloured light reflected by the or each photovoltaic cell 61 of dial 18 reaches the observer unchanged after having passed through the transparent parts of top liquid crystal display 24 again. It thus provides the general colour of dial 18, with the exception of the indices and hands, in the case of FIGS. 1 and 2. In the case of FIGS. 3 and 4, the data 51 displaced by top display 24 appears with its own colour, on a background seen via transparency and having the colour of the dial. One may however envisage the reverse arrangement, i.e. displaying data 51 via transparent regions of the liquid crystal cell via a suitable arrangement of electrodes 40. the characters of symbols displayed will then have the colour of the dial, on a background whose colour will be determined by film 50.

It should be noted that the observer sees the hands and the indices fixed on the dial with their own colour which is not altered, since the background colour is given by the back reflection thereof.

It goes without saying that electro-optical cell 28 can be of another type, provided that in a first switching state, it is transparent and that in a second switching state it is reflective or diffusing.

One could also choose other types of liquid crystal cells, for example cells of the reverse PDLC, nematic gel and cholesteric structure, dynamic scattering type, or of the polymer stabilised cholesteric texture (PSCT) type, or even electrolytic cells or electrochromic cells.

The structure and operation of these types of cells are well known to those skilled in the art and will not be described further.

For a complete description of the structure and operation of a cell of the nematic gel and cholesteric structure type, reference will be made, for example, to U.S. Pat. No. 5,188,760 and European Patent No. 0 451 905.

For a complete description of the structure and operation of a cell of the polymer dispersed liquid crystal type (PDLC), reference will be made for example to U.S. Pat. No. 4,435,047. It will be noted in this regard that a cell of the reverse PDLC type will be chosen if one wishes to obtain a cell which is transparent in the non switched state, and opaque and reflective in the switched state.

For a complete description of the structure and operation of a cell of the dynamic scattering type, reference will be made, for example, to volume 1 of the work entitled "Liquid Crystals Applications and Uses", edited by B. Bahadur, at pages 196–227.

All the aforementioned types of display cells may of course be passively addressed by a matrix network of electrodes, or be actively addressed by non linear elements such as thin film transistors (TFT; thin film transistor MIM, Metal Insulator Metal) or diodes.

For a complete description of the structure and operation of a PSCT type cell, reference will be made for example to U.S. Pat. No. 5,437,811.

For a complete description of the structure and operation of a cell of the electrolytic type, reference will be made for example to the publication by J. Duchêne et al. entitled "Electrolytic Display" published in SID 1978, pages 34 to 37. It will be noted that such a cell is transparent in the non switched state and opaque and reflective in the switched state.

For examples of different types of electrochromic cells, reference will be made to the work "Large-Area Chromnogenics: Materials and Devices for Transmittance Control", C. M. Lampert and C. G. Granqvist, Editors, Part 9: Electrochromic Devices, pages 414 to 549, SPIE Optical Engineering Press, 1990.

The display assembly according to the invention thus allows different display configurations to be obtained as a function of the switching state and type of electro-optical cell, while generating electricity by means of the photovoltaic cell.

Figure 12:
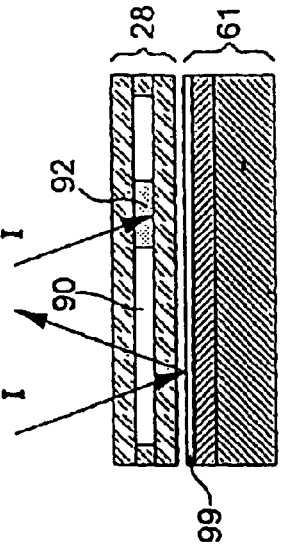
FIGS. 12 to 14 show schematically three other examples of display assemblies according to the invention, in the form of a simplified vertical cross-section and a frontal view of the display.
Figure 12:
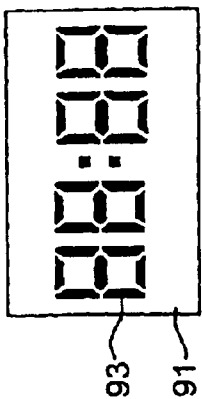
Figure 13:
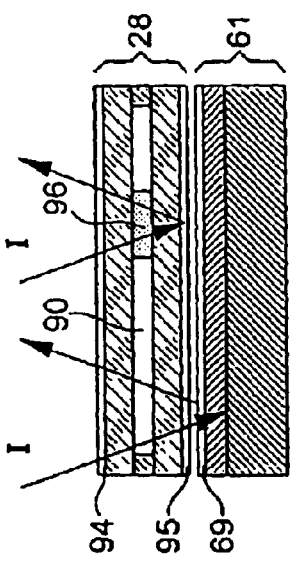
Figure 13:
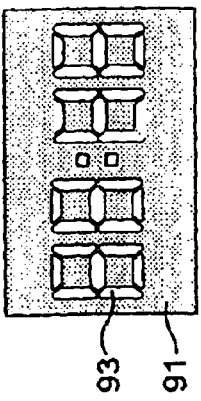
Figure 14:
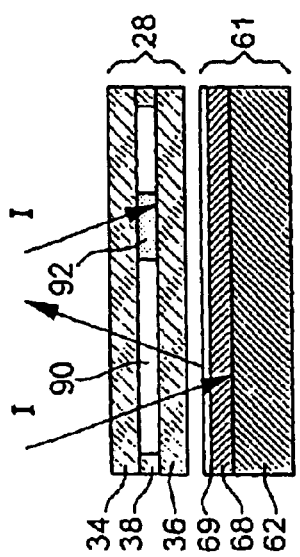
Figure 14:
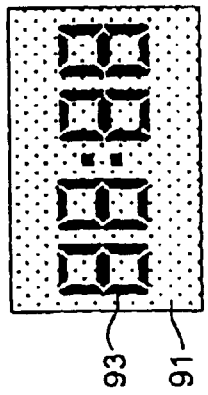

With reference now to FIGS. 12 to 14, three other examples of display assemblies according to the invention will be described and the proportion of incident light which reaches the photodiode will be indicated. It should be noted that there is no analogue display in these cases.

In the structure according to FIG. 12, electro-optical cell 28 and photovoltaic cell 61 may be of the same type as those described with reference to FIGS. 1 to 7. However, in order to transmit the maximum light, the electro-optical cell is preferably a cell of a type without any polarisers, for example a an electrochemical cell, and the photovoltaic cell is of the type shown in FIG. 5. The arrows show that the incident light I, after having passed through transparent regions 90 of electro-optical cell 28, is partially reflected onto photovoltaic cell 61 to form a coloured display background 91, whereas it is absorbed in non transparent regions 92 forming characters 93 displayed in black.

Of course, it is possible to obtain the same appearance for the display if the electro-optical cell is a conventional liquid crystal cell of the TN or STN type, provided with two non reflective linear polarisers, but such a cell allows less light to pass because of the inherent absorption of the polarisers, which reduces the electric energy provided by the photovoltaic cell.

In a similar structure to FIG. 12, it would be possible to use another type of electro-optical cell without any polarisers, in particular a nematic gel type liquid crystal cell. However, in such a cell, non transparent regions 92 are diffusing, so that characters 93 would be white as in the bottom drawing of FIG. 13.

In the structure according to FIG. 13, liquid crystal electro-optical cell 28 is of a type including a front polariser 94 and a reflective back polariser 95 which gives a specific colour, preferably a light colour, to characters 93 formed by regions 96 in the second switching state. Thus, characters 93 appear in a light colour on a background 91 preferably in a dark colour, i.e. a small proportion of the incident light has to be reflected onto photovoltaic cell 61.

In the structure according to FIG. 14, electro-optical cell 28 may of any of the types mentioned with reference to FIGS. 12 and 13. However, photovoltaic cell 61 is of a type in which the top electrode 99 is formed of a transflective metal film, i.e. semi-transparent and semi-reflective. Cells of this type are described in European Patent No. 0 872 783 and may provide a coloured reflection of the incident light, in particular if the electrode is made of a metal such as gold or copper or if it is coated with a protective coloured film. This reflection gives background 91 a light metal appearance, while characters 93 may be another colour or black as in the case of FIG. 12.

The table below indicates typical values for the part A of the incident light I which can be absorbed by the photovoltaic cell in different cases corresponding to FIGS. 12 and 14, as a function of different transmission T coefficients of the components. The column LCD type 1 corresponds to a common liquid crystal cell provided with ordinary linear polarisers. The column LCD type 2 corresponds to a common liquid crystal cell without any polarisers, for example with nematic gel. The case of the multi-layered reflective filter is that of curve 82 of FIG. 8, giving by reflection a violet blue background, with an arrangement according to FIG. 12. The case of the metal mirror is based on 30% transmission through the mirror and corresponds to the arrangement according to FIG. 14.

| Reflector | LCD type 1<br>T ≈ 0.4 | LCD type 2<br>T ≈ 0.85 |
|---|---|---|
| Multi-layered reflective filter, T ≈ 0.8 | A ≈ 0.32 | A ≈ 0.68 |
| Semi-transparent metal mirror, T ≈ 0.3 | A ≈ 0.12 | A ≈ 0.26 |

The examples given above show that the present invention provides those skilled in the art with the means to design assemblies, including a liquid crystal or other display and a photovoltaic cell or a set of photovoltaic cells, having the most simple structure possible and sufficient efficiency, while having a predetermined attractive colour. These display assemblies can be used advantageously in portable apparatus whose aesthetic appearance is an important parameter, in particular watches, or more generally in apparatus such as calculators, telephones, personal digital assistant or electric display hoardings.

What is claimed is:

1. A display assembly including a photovoltaic cell and an electro-optical cell arranged in front of said photovoltaic cell and capable of having transparent regions for transmitting incident light to said photovoltaic cell, wherein said photovoltaic cell is arranged to reflect predetermined visible wavelengths of light transmitted through said electro-optical cell, so that said photovoltaic cell forms a coloured reflector behind said electro-optical cell.

2. A display assembly according to claim 1, wherein said electro-optical cell is a liquid crystal cell.

3. A display assembly according to claim 1, wherein said electro-optical cell is selected from the group consisting of electrochromic and electrolytic electro-optical cell.

4. A display assembly according to claim 1, wherein said electro-optical cell includes means for providing a coloured reflection of the incident light in its non-transparent zones of said electro-optical cell.

5. A display assembly according to claim 1, wherein the reflection of said predetermined visible wavelengths is an interferential reflection via a multi-layered reflective filter including a transparent top electrode of said photovoltaic cell.

6. A display assembly according to claim 5, wherein said photovoltaic cell includes an inner reflector, formed by a reflective substrate or a bottom reflective electrode, and an active photodiode portion formed of semiconductor material having a greater real refractive index than that of said top electrode.

7. A display assembly according to claim 6, wherein said semiconductor material is hydrogenated amorphous silicon.

8. A display assembly according to claim 7, wherein said active photodiode portion has a thickness between 100 and 600 nm and said top electrode has a thickness between 60 and 300 nm, the pairing of said thicknesses leading to a determined colour of the light formed by said reflected predetermined visible wavelengths.

9. A display assembly according to claim 8, wherein said active photodiode portion made of silicon has a thickness between 250 and 450 nm and said top electrode has a thickness between 70 and 150 nm.

10. A display assembly according to claim 5, wherein said top electrode is covered with a transparent or slightly diffusing lacquer layer.

11. A display assembly according to claim 10, wherein said lacquer layer contains dyes or pigments.

12. A display assembly according to claim 1, wherein said photovoltaic cell includes a semi-transparent metal top electrode forming said coloured reflector.

13. A display assembly according to claim 1, including analogue time display means placed in front of said electro-optical cell or between the said electro-optical cell and said photovoltaic cell.

* * * * *